Jan. 6, 1948.                J. P. TARBOX ET AL                    2,433,964
                      WELD INDICATING AND CONTROL APPARATUS
                              Filed June 23, 1944
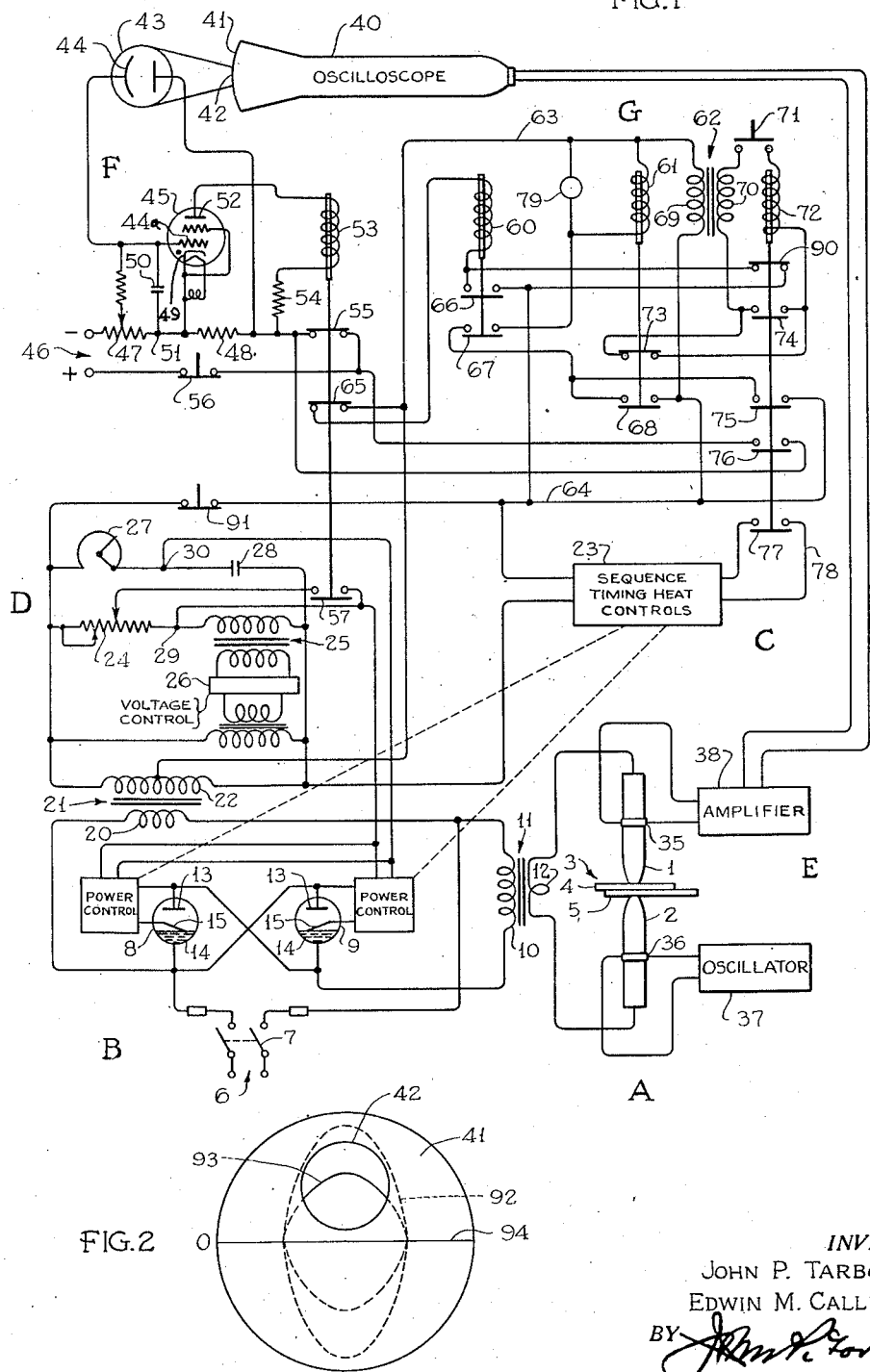
INVENTORS
JOHN P. TARBOX
EDWIN M. CALLENDER
BY 
ATTORNEY Patented Jan. 6, 1948

2,433,964

UNITED STATES PATENT OFFICE 2,433,964

WELD INDICATING AND CONTROL APPARATUS

John P. Tarbox, Philadelphia, and Edwin M. Callender, Cynwyd, Pa., assignors to The Budd Company, Philadelphia, Pa., a corporation of Pennsylvania Application June 23, 1944, Serial No. 541,706

14 Claims. (Cl. 219—4)

This invention relates to systems for welding control and has utility primarily in connection with resistance spotwelding.

In spotwelding, methods of control have been developed which depend for functioning upon whether the heat energy applied to a weld is less or more than that necessary for the completion of a weld which as to time interval is comparable to welds previously made and found to be satisfactory. An obvious disadvantage of this type of control means, that is, a control means dependent upon the average time interval as predetermined by experiment, is that the time interval for a sound weld is not necessarily constant and may vary from weld to weld dependent upon the physical conditions related to each weld such as the resistance, the pressure, etc. Hence, series of welds based upon a predetermined normal may contain a number of defective welds due to individual variations in the physical requirements affecting each weld.

It is a primary object of the present invention to provide a system of welding control which will operate to open the source current of each weld at the time of the completion of each weld and independently of the requirments of any other weld.

Another object of the invention is to provide a system of the type mentioned which will permit elimination of equipment designed to open the welding circuit on variation of weld heating energy from a predetermined normal determined by experiment; still another object of the invention is to provide automatic circuit opening means for the welding current which is entirely independent for its initiation upon electrical conditions at the weld point but is related to physical conditions developing at the weld point during the welding process. Further objects of the invention will appear on consideration of the circuits and apparatus hereinbelow described and illustrated in the accompanying drawing, in which:

Figure 1 is a circuit diagram of the control system; and

Figure 2 is a view of the oscilloscope screen.

Referring to the drawing, there is disclosed diagrammatically a circuit having, generally speaking, seven branches; A, B, C, D, E, F, and G. Branch A designates the point of effective application of the system and includes the electrodes 1 and 2 which are adapted to enclose between the tips thereof the workpiece 3 usually formed of two plates 4 and 5 juxtaposed for welding. The electrodes are provided with means for applying automatically some degree of pressure to the plates to secure a sufficient amount of electrical and heat conductivity and transmit to the plates current at such a rate as to bring about in a few cycles of a sixty-cycle flow fusion at the interface between the plates thereby resulting in the formation of a nugget of molten metal which on solidification results in a permanent bond. Obviously, welds so formed are sound or unsound. An unsound weld is one in which the heat energy applied is insufficient to bring about an adequate amount of fusion, or one in which the amount of heat is in excess of the necessary amount bringing about chemical or physical changes in or adjacent the weld, which causes serious weakening thereof. A normal sound weld may be defined as such a weld that requires a minimum amount of metal which on solidification affords the weld the maximum attainable strength consistent with the avoidance of undesired effects upon the metal in and at the region of the weld.

Current for supplying the heat energy for the welding operation is supplied from a power source 6, as indicated in Branch B of the main circuit. This is usually a sixty-cycle alternating current which is led through the main switch 7 to a circuit including the gaseous power tubes 8 and 9, usually known as ignitrons, inversely connected in series with the primary 10 of the welding transformer 11. The secondary 12 of this transformer has ends each connected to one of the electrodes 1 and 2. Each ignitron includes an anode 13, a cathode 14 usually of mercury, and ignitor 15, the anode and ignitor of each tube having connection to a separate power control circuit for direct initiation of the ignitor at the appropriate timed interval for utilizing successive half-cycles of the alternating current.

The power source 6 also supplies the primary 20 of a control transformer 21, the secondary 22 of which leads to a group of control circuits indicated by the box 23 and including the sequence timing and heat controls of section C. This secondary also supplies current to the compensator circuit indicated by the letter D and including a four-armed bridge phase shift. The arms of this bridge include the variable resistor 24, the variable impedance transformer 25 having connection to the compensator control varying means 26, the variable resistor 27 and the capacitor 28. Point 29 between the variable resistor and transformer and point 30 between the resistor and capacitor are connected to each of the power control circuits of the ignitrons so as to modify appropriately the percentage of each half-cycle of current available for weld heating in accordance with the variation of line voltage. The phase change circuit is also employed to effect changes in the heat setting through manual means as desired by the operator in accordance with well known usage as shown for example in the patent to Robert S. Phair, No. 2,330,377. As shown in Figure 1, the resistor 24 is variable in order to vary the heat effect of the weld as will be explained more fully hereinafter.

It is desirable that means be employed for signaling completion of a weld which is independent of the flow of current through the weld and we have found effective means for this accomplishment in the use of a transducing arrangement employing supersonic sound waves as described in the copending application of John P. Tarbox and Edwin M. Callender, Serial No. 493,256, of which we are co-applicants and assignors to the same assignee. As described in this copending application, we insert in the electrodes of the welding apparatus, adjacent the tips, transverse plates 35 and 36 of Rochelle salt crystal. One of the plates, plate 36 for example, is connected to an oscillating circuit 37 which may conveniently be, as described in our copending application, an electrical oscillating circuit including an electronic source properly controlled to give circuit oscillations of the desired frequency. These oscillations may readily be led to the crystal 36 and transformed into mechanical vibrations of supersonic frequency. The vibrations are led through the electrode 2, the workpiece 3, electrode 1, to the crystal 35 which is connected in series with an amplifying unit of electronic nature, generally indicated by the box 38 and, from the amplifier, connection is made to an indicating or metering device, such as the cathode ray oscilloscope 40.

The oscilloscope is of conventional construction and is designed for the projection of an electron beam trace on the screen 41 but normally offset from a light transmitting area 42, movement of the electron beam to the light area taking place only on appropriate energization occurring in the connected crystal circuit which I have designated the E branch circuit.

Figure 2 illustrates the trace change occurring on the screen 41, the trace 92 indicating the pre-weld sweep at double oscillator frequency and trace 93 the post-weld trace. The light transmitting area 42, which is displaced from the zero line 94 permits transmission only of the post-weld trace as indicated in full lines.

Adjacent the screen of the oscilloscope and external thereto is a photo-tube 43 having a screen 44 sensitive to light and adapted, when energized by the light beam from the oscilloscope transmitted from the area 42, to make positive the control grid 44a in the gas tetrode 45 connected across the terminals of a source 46 of direct current. Appropriate voltage values are applied to the tetrode by the use of a voltage dividing circuit including the resistors 47 and 48 connected in series. The cathode 49 of the tube has connection to the circuit between the resistors 47 and 48 and the control grid connection normally through a biasing resistor to a point on the resistor 47. A biasing capacitor 50 is also connected between the control grid and point 51 between the resistors 47 and 48. The anode 52 of the tube is connected through a relay coil 53 and resistor 54 to the positive side of the resistor 48.

In the functioning of this branch unit F the values of the resistors are so chosen that normally a substantial positive potential is applied to the anode 52 of the tube, and a negative voltage to the control grid of such amount as to prevent flow of current through the tube. However, upon energization of the photo-tube through impingement of the light beam on the screen 44 thereof a positive potential from the positive side of the resistor 48 of the supply circuit is made effective at the control grid 44 permitting current flow through the tube and energization of the relay coil 53. Included in the supply circuit from source 46 in the F circuit are normally closed relay switch 55 operated by relay coil 53 and the manual re-set switch 56 intended for release of power application to this circuit under certain conditions at normal weld as will hereinafter be described. Relay 53 is adapted to operate the normally open switch 57 in a branch circuit short circuiting a section of the phase shift resistor 24.

Branch circuits E and F, including the oscilloscope 40, are operative to open the welding circuit on completion of a normal weld. In case the weld is defective, this circuit fails to function and hence it is desirable that means be employed to prevent a continuation of the welding process with new welds until the defective weld has been corrected. This is accomplished by means of the branch circuit G, which is associated with the F and C circuits. As illustrated, the G circuit obtains power from the control transformer 21 and comprises two relays 60 and 61 and a transformer 62 connected across the conductors 63 and 64 leading from the power source. The relay 60 is connected from conductor 63 through a normally closed relay switch 65 operated by relay 53 of circuit F. Connection to conductor 64 from relay 60 is made through normally open switch 66. Relay 61 is connected from conductor 63 through a normally open switch 67 operated by relay 60 and normally open switch 68 operated by relay 61 to conductor 64. The transformer 62 is provided with a primary 69 connected directly across the conductors 63–64 and a secondary 70 forming part of an initiating circuit including the initiating manual switch 71, a relay coil 72, normally closed switch 73 adapted to be operated by relay 61. A normally opened switch 74 in parallel with closed switch 73 is adapted to be operated by the relay 72. In addition, relay 72 is designed to operate the normally closed switch 90 in a shunt circuit around switch 66, open switch 75 in parallel with switch 68 of the circuit including relay 61, normally open switch 76 of the F branch circuit and normally open switch 77 in the circuit 78 adapted to initiate the sequence timing and heat controls 23 of the welding circuit.

A gong 79, or other audible signaling device, is placed in parallel with relay 61 for indicating improper welds.

The operation of the control system will now be described. Assuming that a workpiece 3 has been interposed between the electrodes of the welding apparatus and the main switch 7 from the power source 6 closed, it will be apparent that power is immediately applied between the conductors 63 and 64 so that transformer 62 is energized as well as relay 60. This results in the closure of relay switches 66 and 67, thus locking the relay 60 in energized position and conditioning relay 61 for energization upon the closure of the initiating switch. The initiating switch is then closed, activating relay 72 to open switch 90, by-passing switch 66 of the relay 60 circuit, closing switch 74 to lock in the relay 72 circuit, closing switch 75 to activate the relay 61 circuit, closing switch 76 through the relay 53 circuit of Branch F, and closing switch 77 in the control circuits. This results in a lock-in of relays 60, 61 and 72, a conditioning of relay 53 for de-energization upon the opening of switch 71 and the starting of the sequence of controls bringing about the transmission of welding current through the ignitrons and welding transformer 11 to the workpiece 3 and causing the formation of the weld at the interface of the workpiece.

If a normal weld results from the flow of current at the weld point, a nugget of fused metal will appear at the interface. Prior to the formation of this fused nugget, the oscillator 37 will have transmitted to the weld point, as transformed by the crystal 36, supersonic vibrations which are again transformed into electrical oscillations by the crystal 35 and led through the amplifier to the oscilloscope 40. At the oscilloscope, however, the electron beam impinges on the screen 41 at a point offset from the transmission area 42 and, hence, the control circuit F remains unaffected. As soon, however, as fusion develops at the weld point, the energy transmitted is lessened, thus reducing the amplitude of the image on the oscilloscope screen and causing a section of the curve to appear on the transmisison area 42 whereupon light is transmitted to the photo-cell, the control screen 44 becomes sufficiently positive to permit current flow through tube 45, relay 53 is energized to open closed switches 55, 65 and to close switch 57 in the compensator circuit D and in circuit G relays 60 and 61 become deenergized, thus opening their associated switches and conditioning the initiating relay 72 circuit for initiaton of a subsequent weld cycle on completon of the current cycle.

Closure of switch 57 in the D circuit effectively short-circuits resistor 24 in the phase shift bridge which reduces the current flow to a point at which the heat energy applied to the weld is substantially zero. This is brought about by a shift in the phase angle of the heating cycle to such a point as to permit negligble amounts of current to flow during each half-cycle as will be readily understood by those skilled in this art. It is pointed out that while we have indicated that the phase shift reduces heat energy to a negligible value, by shifting the contacts on resistor 24 any desired heat change may be obtained within the limits of the apparatus. For example, during the remainder of the current cycle from the time of actuation of switch 57 to the point of timer closure, the heat supply as determined by resistor may be one-half the initial value. At the end of the timing period, as set by the timing control, or as determined by a manual control, such as the initiating switch 71, the circuit will open. In the case of the initiating switch 71 release of the same causes closure of switch 90 to condition relay 60 for a new set of operations in a subsequent weld sequence, opens switch 74 associated with relay 61 switch 73, opens switch 75, in the relay 61 circuit, opens switch 76 in the relay 53 circuit, and opens switch 77 in the main control circuit.

In the event that the weld for some reason is defective, either through an excess of current flow, an insufficient amount of current flow, or failure of current flow entirely, the oscilloscope fails to transmit a visible beam through the transmission area 42 and, hence, the relay 53 remains de-energized throughout the welding cycle. As a consequence, relays 60 and 61 in the G branch remain energized and the gong 79 sounds continuously. Also, switch 73 of relay 61 is open and consequently, at the completion of the cycle, or the opening of the initiating switch 71, it is impossible to re-initiate a subsequent welding cycle since both switch 73 and switch 74 of the relay 72 circuit are open. Thus, the operator is informed that the welding operation of the prior cycle is incomplete or ineffective and adjustment may be made if the defect is continued to permit a reestablishment of a welding sequence. After the failure of a weld, as above mentioned, it is necessary for the operator to release the relays 60 and 61 by manipulation of the re-set switch 91 in conductor 64. Re-set switch 56 is also provided to de-energize tube 45 after initiation of current flow therethrough if for any reason the circuit remains closed.

In the case of no weld since the E, F, G circuit fails to open the welding circuit, opening is accomplished by the regular timing control which is set so as to be effective a short time interval after the approximate maximum time period for a normal weld.

From the above it is apparent that we have provided an electrical system for resistance welding which indicates the completion of a weld by virtue of changes in the physical condition of the material at the weld point and that we have associated with the weld completion mechanism and circuit arrangements which automatically de-energize the welding circuit on the completion of the normal weld and which, moreover, prevent the reestablishment of a welding cycle should a given cycle result in a defective weld or a failure of any weld to be produced.

The specific diagrammatic showing is shown to illustrate a workable combination of elements and circuits which will accomplish the objects of the invention. It is however, apparent that modifications of these circuits and elements may be made, such as by substitution of well-known equivalents and, hence, the invention should not be limited to the precise arrangement shown, other than may be required by the scope of the claims hereto appended.

What is claimed is:

1. In a system for welding, electrodes adapted to engage a workpiece to effect a weld therein, a welding circuit adapted to supply welding current to said electrodes during a welding cycle, control means for varying the cycle fraction at which current is supplied said electrodes, means responsive to fusion at the workpiece weld point, disabling means associated with said control means for reducing the fraction of the cycle of current flow on weld completion, and transmission means between the weld change sensitive means and disabling means.

2. In a system for welding, electrodes adapted to engage a workpiece to effect a weld therein, a welding circuit adapted to supply welding current to said electrodes during a welding cycle, circuit means independent of said welding circuit sensitive to physical changes at the workpiece weld point during a weld, disabling means for making said welding circuit ineffective on weld completion, transmission means between the circuit means and the disabling means, and means for preventing repetition of a welding cycle on occurrence of an abnormal weld.

3. In a system for welding, electrodes adapted to engage a workpiece to effect a weld therein, a welding circuit adapted to supply welding current to said electrodes during a welding cycle, control means for said welding circuit for predetermining the section of a current cycle in which current is supplied said electrodes including a phase change unit having a phase changing resistor, means responsive to fusion at the workpiece weld point, disabling means associated with said unit for making said welding circuit ineffective on weld completion, and transmission means between the weld change sensitive means and disabling means, said disabling means comprising a short-circuiting conductor for said phase change resistor, a switch in said short-circuiting conductor, and means dependent on said weld change sensitive means for closing said switch.

4. In a system for welding, electrodes adapted to engage a workpiece to effect a weld therein, a welding circuit adapted to supply welding current to said electrodes during a welding cycle, means independent of said welding circuit sensitive to changes at the workpiece weld point, disabling means for making said welding circuit ineffective on weld completion, and transmission means between the weld change sensitive means and the disabling means, said transmission means including a cathode ray tube having a light transmitting screen area, a photo-tube adapted for energization by light from said cathode ray tube, and electronic means operable on energization of said photo-tube for actuating said disabling means.

5. In a system for welding, electrodes adapted to engage a workpiece to effect a weld cycle therein, a source of welding energy, circuit means for establishing a flow of energy from said source through the weld point of said electrodes, independent means for establishing a flow of energy through the weld point of said electrodes, disabling means for making said circuit means ineffective, and means effective only on weld completion in the workpiece and dependent on a change of energy flow through the electrodes from said independent energy source for initiating the action of said disabling means.

6. In a system for welding, electrodes adapted to engage a workpiece to effect a welding cycle therein, a source of welding energy, circuit means for establishing a flow of energy from said source through the weld point of said electrodes, means for changing the amount of energy effective at the weld point during a weld cycle, a separate source of energy connected across the electrodes for control of weld energy change during a weld cycle, means sensitive to control energy changes at the weld point and means connected to said sensitive means for initiating actuation of said weld energy changing means on actuation of said sensitive means.

7. In a system for welding, electrodes adapted to engage a workpiece to effect a welding cycle therein, a source of welding energy, circuit means for establishing a flow of energy from said source through the weld point of said electrodes, means for reducing the amount of energy effective at the weld point during a weld cycle, a separate source of energy connected across the electrodes for control of weld energy change during a weld cycle, means sensitive to control energy changes at the weld point, means connected to said sensitive means for initiating actuation of said weld energy changing means on actuation of said sensitive means, and automatic means for stopping the reduced energy flow after a predetermined time interval.

8. In a system for welding, electrodes adapted to engage a workpiece to effect a weld cycle therein, a source of welding energy, circuit means for establishing a flow of welding energy from said source through the weld point of said electrodes, disabling means for making said circuit means ineffective on weld completion, means independent of the change of magnitude of energy flow through said electrodes for different weld cycles and dependent only on the change of energy flow through the electrodes in any one weld cycle for initiating the action of said disabling means and means for preventing the repetition of a weld cycle on failure of functioning of said disabling initiation means.

9. In a welding system, electrodes adapted to engage a workpiece to effect a weld therein, a weld circuit adapted to supply welding current to said electrodes during a welding cycle, means connected to the electrodes sensitive to weld completion including an oscilloscope having a light trace screen, means associated with said screen for preventing egress of tracing light through the screen prior to weld completion, and circuit means including a light sensitive element positioned to receive light through said screen for reducing to a point of zero the welding current through the electrodes on completion of a weld during the weld cycle.

10. In a system for welding, electrodes adapted to engage a workpiece to effect a weld cycle therein, a source of welding energy, circuit means for establishing a flow of energy from said source through the weld point of said electrodes, disabling means for making said circuit means ineffective on weld completion, means independent of magnitude of energy flow through said electrodes but dependent only on the change of energy flow for initiating the action of said disabling means, and separate means for stopping energy flow through the electrodes and preventing repetition of the welding cycle on failure of the disabling means to function.

11. In a system for welding, electrodes adapted to engage a workpiece, means for supplying energy to said electrodes throughout a weld cycle in the engaged workpiece, control means including a switch for controlling the energy supply to said electrodes, disabling means for terminating the weld cycle, and initiating means dependent only on the change of energy flow through the electrodes in said weld cycle for initiating the action of said disabling means, said disabling means comprising a relay adapted to operate said switch.

12. In a system for welding, electrodes adapted to engage a workpiece, means for supplying energy to said electrodes throughout a weld cycle in the engaged workpiece, disabling means for terminating the weld cycle, and means for preventing repetition of a welding cycle on occurrence of an abnormal weld.

13. In electric resistance welding apparatus, the combination including a power source, coacting electrodes adapted to receive a workpiece for welding treatment, energy-response means connected to said electrodes, and means dependent on weld formation in the workpiece and normally independent of absolute value of supply of welding power to said workpiece for actuating said energy-response means, said energy-response means comprising a cathode ray tube having a light trace screen, a light-sensitive element positioned to receive light transmitted through said screen, translating apparatus adapted to be energized on light reception by said light-sensitive element, and means for transmitting light from the tube to said element only on energy change in said energy-response actuating means.

14. In electric resistance welding apparatus, the combination including a power source, coacting electrodes adapted to receive a workpiece for welding treatment, energy-response means connected to said electrodes, and means dependent on weld formation in the workpiece and normally independent of absolute value of supply of welding power to said workpiece for actuating said energy-response means, said energy-response means comprising a cathode ray tube having a light trace screen, and translating means actuated by passage of light through said screen.

JOHN P. TARBOX.
EDWIN M. CALLENDER.

REFERENCES CITED

The following references are of record in the file of this patent:

UNITED STATES PATENTS

| Number | Name | Date |
|---|---|---|
| 1,314,515 | Gravell | Sept. 2, 1919 |
| 1,959,690 | Roth | May 22, 1934 |
| 1,975,753 | Delano et al. | Oct. 2, 1934 |
| 1,991,414 | Rees | Feb. 19, 1935 |
| 2,288,567 | Heitman et al. | June 30, 1942 |
| 1,985,107 | Roth (2) | Dec. 18, 1934 |
| 2,158,640 | Strange et al. | May 19, 1939 |
| 2,093,982 | Ragsdale et al. | Sept. 21, 1937 |
| 2,104,749 | Jones | Jan. 11, 1938 |
| 1,043,637 | Smith | Nov. 5, 1912 |
| 1,848,905 | Rabezzana | Mar. 8, 1932 |
| 1,967,094 | Lincoln | July 17, 1934 |